US012629947B2

(12) United States Patent
Ohhashi et al.

(10) Patent No.: US 12,629,947 B2
(45) Date of Patent: May 19, 2026

(54) IMAGE FORMING DEVICE CONFIGURED TO FORM IMAGE ON ROLLED-TYPE MEDIUM AND SHEET-TYPE MEDIUM

(71) Applicant: BROTHER KOGYO KABUSHIKI KAISHA, Nagoya (JP)

(72) Inventors: Masashi Ohhashi, Kasugai (JP); Satoru Arakane, Nagoya (JP); Koichi Tsugimura, Nagoya (JP); Haruka Azechi, Nagoya (JP); Yasuhiro Nakano, Nagoya (JP); Ayaka Hotta, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/887,254

(22) Filed: Sep. 17, 2024

(65) Prior Publication Data

US 2025/0010640 A1 Jan. 9, 2025

Related U.S. Application Data

(63) Continuation of application No. 18/068,634, filed on Dec. 20, 2022, now Pat. No. 12,128,677.

(30) Foreign Application Priority Data

Dec. 24, 2021 (JP) ................................ 2021-210978

(51) Int. Cl.
*B41J 13/00* (2006.01)
*B26D 1/18* (2006.01)
(Continued)

(52) U.S. Cl.
CPC .......... *B41J 13/0054* (2013.01); *B26D 1/185* (2013.01); *B41J 11/006* (2013.01);
(Continued)

(58) Field of Classification Search
CPC .. B41J 13/0054; B41J 11/006; B41J 11/0095; B41J 11/485; B41J 11/70; B41J 13/0018; B26D 1/185; B26D 1/20; B26D 7/24
See application file for complete search history.

(56) References Cited

U.S. PATENT DOCUMENTS 12,128,677 B2 * 10/2024 Ohhashi ................ B26D 1/185
2004/0096256 A1 * 5/2004 Hayashi ................ B26D 1/385
400/621
(Continued)

FOREIGN PATENT DOCUMENTS

JP H01279365 A 11/1989
JP H08-169580 A 7/1996
(Continued)

OTHER PUBLICATIONS

Notice of Allowance dated Jun. 21, 2024 from parent U.S. Appl. No. 18/068,634.

*Primary Examiner* — Henok D Legesse
(74) *Attorney, Agent, or Firm* — Scully, Scott, Murphy & Presser, P.C.

(57) ABSTRACT

An image forming device is configured to form an image on sheet-type medium including a rolled-type medium and a plurality of sheet-type media. The image forming device comprises a first medium container configured to accommodate the rolled-type medium by winding a long sheet-type medium in a roll, a second medium container configured to accommodate the plurality of sheet-type media in a stacked manner, a medium conveyer, an image forming device configured to form an image on the sheet-type medium, a cutting device configured to cut the rolled-type medium, and a controller. The medium conveyer conveys the plurality of sheet-type media accommodated in the second medium container even in a case where an error (Continued)

occurs in an operation related to printing on the rolled-type medium accommodated in the first medium container.

11 Claims, 6 Drawing Sheets

(51) Int. Cl.

| | |
|---|---|
| ***B41J 11/00*** | (2006.01) |
| ***B41J 11/48*** | (2006.01) |
| ***B41J 11/70*** | (2006.01) |
| *B26D 1/20* | (2006.01) |
| *B26D 7/24* | (2006.01) |

(52) U.S. Cl.
CPC .......... *B41J 11/0095* (2013.01); *B41J 11/485* (2013.01); *B41J 11/70* (2013.01); *B41J 13/0018* (2013.01); *B26D 1/20* (2013.01); *B26D 7/24* (2013.01)

(56) References Cited

U.S. PATENT DOCUMENTS

| | | | | |
|---|---|---|---|---|
| 2006/0087546 | A1* | 4/2006 | Tsuji | B41J 11/70 347/104 |
| 2011/0211007 | A1* | 9/2011 | Okamoto | B41J 11/006 347/16 |
| 2012/0056365 | A1 | 3/2012 | Kato | |
| 2021/0237492 | A1 | 8/2021 | Watari et al. | |
| 2021/0276344 | A1 | 9/2021 | Wada | |
| 2022/0203714 | A1 | 6/2022 | Sato | |

FOREIGN PATENT DOCUMENTS

| | | | |
|---|---|---|---|
| JP | 2005250273 | A | 9/2005 |
| JP | 2005262810 | A | 9/2005 |
| JP | 2013-71227 | A | 4/2013 |
| JP | 2014000716 | A | 1/2014 |
| JP | 2017056608 | A | 3/2017 |
| JP | 2021155198 | A | 10/2021 |

* cited by examiner

IMAGE FORMING DEVICE CONFIGURED TO FORM IMAGE ON ROLLED-TYPE MEDIUM AND SHEET-TYPE MEDIUM

REFERENCE TO RELATED APPLICATIONS

This application is a continuation application of U.S. Ser. No. 18/068,634 filed on Dec. 20, 2022 and claims priority under 35 U.S.C. § 119 from Japanese Patent Application No. 2021-210978 filed on Dec. 24, 2021. The entire subject matter of each application is incorporated herein by reference.

BACKGROUND ART

The present disclosures relate to an image forming device configured to form an image on a sheet-type recording medium and an image forming system employing such an image forming device.

Conventionally, a printing device configured to form (print) an image on a sheet-type recording medium has been known. Such a printing device is typically configured such that a roll sheet (a sheet-type recording medium wound into a roll) is unwound from the roll, conveyed toward a print engine and an image is printed thereby. Then, the roll sheet is further conveyed toward a cutter, and cut out by the cutter.

SUMMARY

In a conventional printing device as described above, when there occurs a malfunction in a cutter configured to cut the sheet media such as the roll sheet or other sheet media, or when there occurs a paper jam or other abnormality in an area surrounding the cutter, the image formation is prohibited. That is, in such a conventional printing device, the image formation cannot be performed at all until the abnormality is resolved, which reduces convenience.

According to aspects of the present disclosure, there is provided an image forming device configured to form an image on sheet-type medium including a rolled-type medium and a plurality of sheet-type media, comprising a first medium container configured to accommodate the rolled-type medium by winding a long sheet-type medium in a roll, a second medium container configured to accommodate the plurality of sheet-type media in a stacked manner, a medium conveyer configured to convey the sheet-type medium, an image forming device configured to form an image on the sheet-type medium conveyed by the medium conveyer, a cutting device configured to cut the rolled-type medium, and a controller. When receiving a print instruction to print an image by the image forming device, the controller is configured to cause the medium conveyer to convey the plurality of sheet-type media accommodated in the second medium container even in a case where an error occurs in an operation related to printing on the rolled-type medium accommodated in the first medium container.

DESCRIPTION

Hereinafter, referring to the accompanying drawings, an embodiment according to aspects of the present disclosures will be described.

Figure 1:
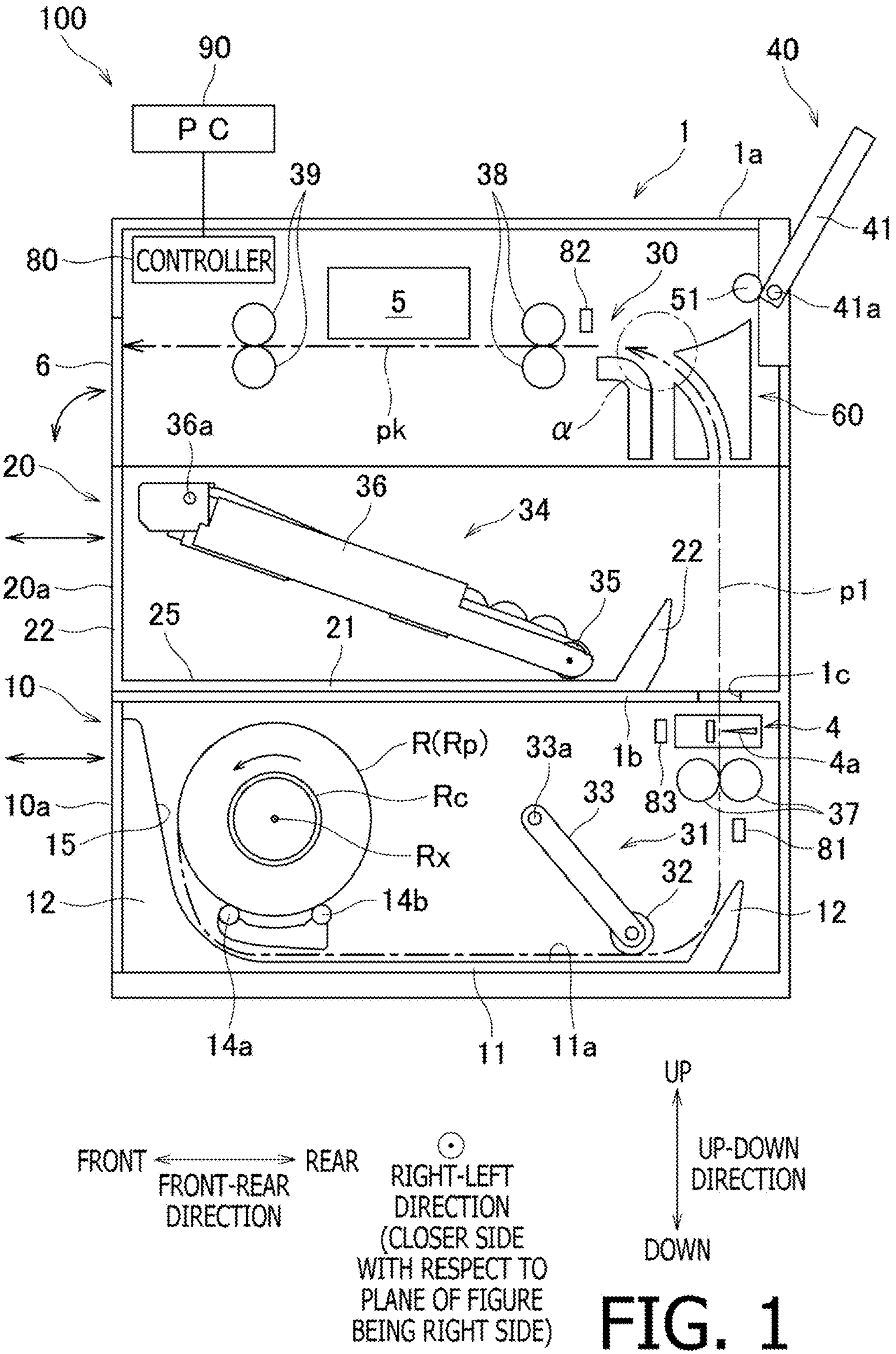
FIG. 1 is a cross-sectional side view of a printer system schematically showing an internal configuration, regarding the conveyance of a roll sheet, of a printer.

As shown in FIG. 1, a printer system 100 includes a printer 1 and a PC (personal computer) 90 which is communicatively connected to a controller 80 of the printer 1 in such a manner that information can be transmitted/received between the printer 1 and the PC 90. It is noted that an up-down direction and a front-rear direction indicated in FIG. 1 are an up-down direction and a front-rear direction of the printer 1, respectively. It is noted that the printer system 100 is an example of an image forming system according to aspects of the present disclosures, and the PC 90 is an example of a computer according to aspects of the present disclosures.

The printer 1 and the PC 90 are mutually connected via a LAN (local area network), a communication network such as the Internet, or a cable (e.g., a USB cable), so that a data communication can be performed therebetween. The PC 90 includes a CPU (central processing unit), a ROM (read only memory), a RAM (random access memory) and an HDD (hard disk drive). The ROM and the RAM are configured to store programs and data which are used by the CPU to execute various controls. Further, the RAM is used to temporarily store data which is used by the CPU when executing the programs. The PC 90 is connected with input devices such as a keyboard and a mouse, and an output device such as a display device. In the HDD of the PC 90, driver software enabling the printer 1 to perform image formation by transmitting/receiving data with the printer 1 is installed. Various programs including the operating system software and the like as well as the driver software cause the CPU to perform particular processes, thereby the PC 90 performing various processes described later.

The printer 1 includes a housing 1*a*, a first sheet feed tray 10, a second sheet feed tray 20, a conveyer 30, a multi-purpose tray 40 (hereinafter, referred to as an MP tray 40), a cutting device 4, a head 5, a discharge tray 6, and a controller 80. The discharge tray 6 constitutes one side wall of an upper portion of the housing 1*a*, and is configured to be openable/closeable with respect to the housing 1*a*. It is noted that the first sheet feed tray is an example of a first medium container, and the second sheet tray is an example of a second medium container.

Figure 2:
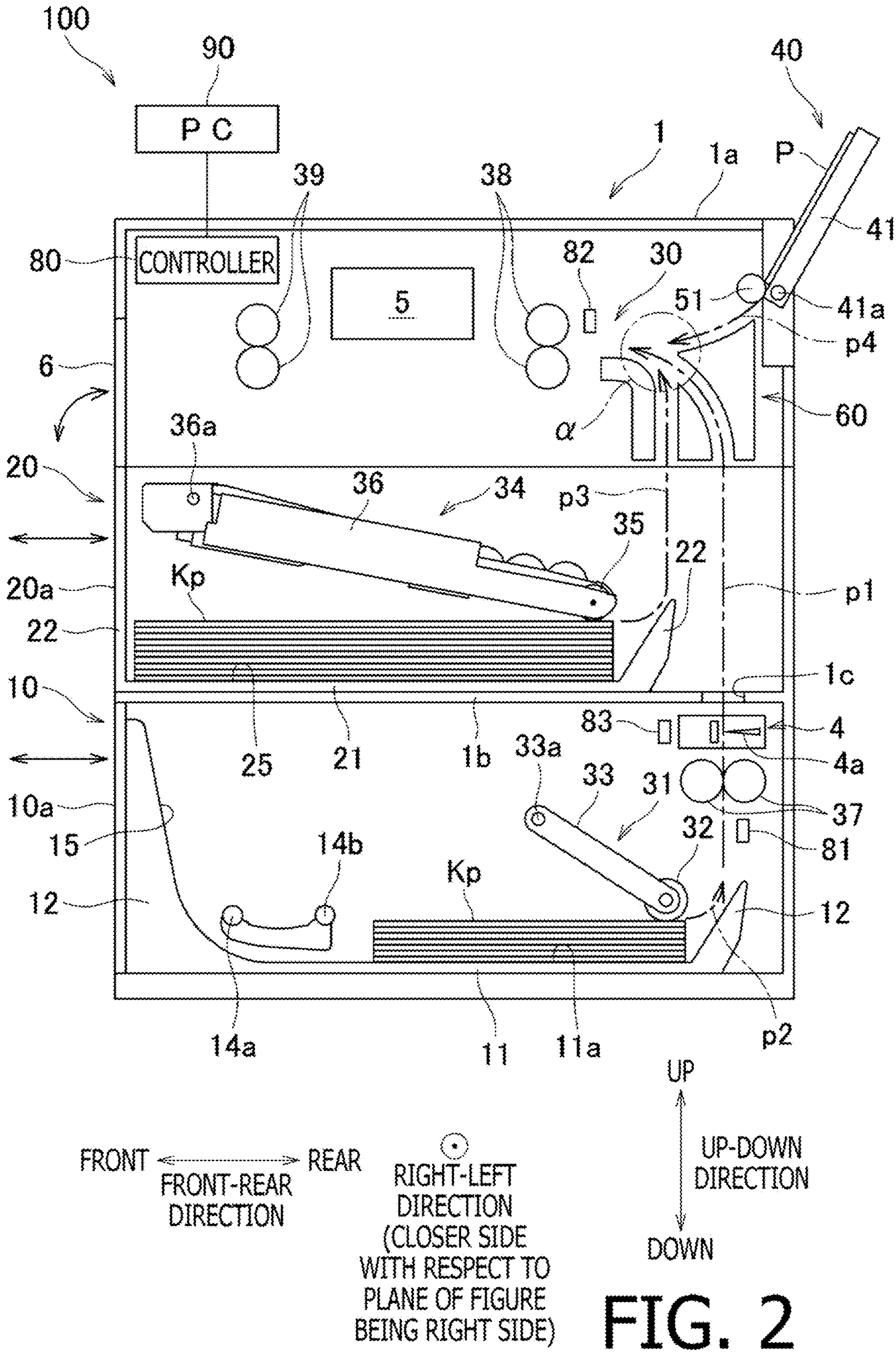
FIG. 2 is a cross-sectional side view of the printer system schematically showing an internal configuration, regarding the conveyance of a cut sheet, of the printer.

As shown in FIG. 1, the first sheet feed tray 10 is arranged at a lowermost portion inside the housing 1*a*. The first sheet feed tray 10 has a box-shaped body 10*a* having a bottom wall 11 and four side walls 12 standing on the edges of the bottom wall 11. In FIGS. 1 and 2, only two of the four side walls 12 standing on the front and the rear edges of the bottom wall 11, respectively, are shown. The first sheet feed tray 10 has, as shown in FIG. 1, a roll body container 15 configured to contain a roll body R. The roll body R is, as shown in FIG. 1, a roll sheet Rp, which is a long sheet, wound around a core member Rc in a roll shape. It is noted that the roll sheet Rp is an example of a long sheet-type medium according to aspects of the present disclosures. The roll sheet Rp is drawn and unwound from the roll body R and arranged on an inner bottom surface 11*a* (i.e., an upper surface of the bottom wall 11), thereby conveyance of the roll sheet Rp toward the head 5 being ready.

As shown in FIG. 2, the first sheet feed tray 10 is configured to accommodate cut sheets Kp on the inner bottom surface 11*a*. The cut sheets Kp are short sheets, and are, for example, A4 size (210 mm×297 mm) sheets or B5 size (182 mm×257 mm) sheets. The first sheet feed tray 10 is configured to accommodate multiple cut sheets Kp on the inner bottom surface 11*a* in a stacked manner. It is noted that the cut sheet Kp is an example of a short sheet-type medium according to aspects of the present disclosures.

In the following description, when it is unnecessary to distinguish the roll sheet Rc unwound from the roll body R from the cut sheets Kp or other types of sheets, the sheets may be collectively referred to by a term "sheet P." The first sheet feed tray 10 is configured to be inserted to and withdrawn from the housing 1*a*, in the front-rear direction, through an opening formed on the front wall of the housing 1*a*.

The second sheet feed tray 20 is arranged in a space, inside the housing 1*a*, above the first sheet feed tray 10 and below the head 5. It is noted that a space inside the housing 1*a* is divided, in a vertical (i.e., the up-down) direction, by a partition plate 1*b* into a space in which the first sheet feed tray 10 is arranged and another space in which the second sheet feed tray 20 is arranged. The second sheet feed tray 20 has, as shown in FIG. 1, a box-like main body 20*a* having the bottom wall 21 and four side walls standing at respective edges of the bottom wall 21. It is noted that only two side walls 22 standing from a front edge and a rear edge of the bottom wall 21 are shown in FIGS. 1 and 2. The second sheet feed tray 20 has a cut sheet accommodator 25 configured to accommodate a plurality of cut sheets Kp in a stacked manner as shown in FIG. 2. The second sheet feed tray 20 is configured to be inserted to and withdrawn from the housing 1*a*, in the front-rear direction, through an opening formed on the front wall of the housing 1*a*.

The MP tray 50 enables usage of any of various types of printing sheets (e.g., the cut sheets Kp, glooming sheets, various types of short sheets) and the like for image printing. It is noted that the various types of short sheets are examples of short sheet-type medium according to aspects of the present disclosures. The MP tray 40 includes a tray body 41 provided in the vicinity of an upper rear end portion of the housing 1*a*. The tray body 41 is rotatably supported by a supporting shaft 41*a*. The supporting shaft 41*a* is slidably supported by the housing 1*a* so as to be slidable in the up-down direction. The housing 1*a* is configured to support the tray body 41 in such a manner that the tray body 41 is inclined with respect to the right-left direction as shown in FIGS. 1 and 2 when in use.

When the short sheets (e.g., the cut sheets Kp) are placed on the tray body 41, the sheets P are arranged along a front-side surface of the tray body 41 as shown in FIG. 2 with the lower ends of the sheets being contacted to a feed roller 51 (described later), thereby the tray body 41 and the feed roller 51 supporting the short sheets (see FIG. 2). In this way, the short sheets are set onto the MP tray 40 so as to be conveyed. When the MP tray 40 is not used (i.e., no sheets are placed on the MP tray 40), by rotating the tray body 41 counterclockwise about the supporting shaft 41*a* in such a manner that the front and rear faces thereof extend vertically and by sliding the supporting shaft 41*a* downward, the tray body 41 is accommodated inside the housing 1*a* and is set to a non-use state.

The conveyer 30 has a first feeder 31, a second feeder 34, the feed roller 51, an intermediate roller pair 37, a conveying roller pair 38, a discharging roller pair 39, and a guide 60. The first feeder 31 includes a feed roller 32, an arm 33, and a first feeding motor 31M (see FIG. 3). The feed roller 32 is configured to feed the roll sheet Rp or the cut sheet Kp from the first sheet feed tray 10. The feed roller 32 is arranged above the bottom wall 11. The feed roller 32 is rotatably supported by a shaft provided at a tip end of the arm 33. When the first feeding motor 31M is driven to rotate, the feed roller 32 is rotated. The arm 33 is freely rotatably supported by the shaft 33*a*. The shaft 33*a* is supported by the housing 1*a*. A force is applied to the arm 33 from an elastic member such as a plate spring or a coil spring to urge the feed roller 32 toward the bottom wall 11. It is noted that the arm 33 is driven by a conventionally-known driving mechanism to rotate in conjunction with moving of the first sheet feed tray 10 in such a manner that the feed roller 32 is located at a higher position than an upper end of the rear side wall 12 of the first sheet feed tray 10 when the first sheet feed tray 10 is inserted to or withdrawn from the housing 1*a*.

When the roll sheet Rp or the cut sheets Kp exists on the bottom wall 11, the feed roller 32 is in contact with the roll sheet Rp or the uppermost one of the cut sheets Kp. When the first feeding motor 31M is driven under control of the controller 80 in this state, the feed roller 32 rotates and a conveying force directed from the front side to the rear side is applied to the roll sheet Rp or the uppermost cut sheet Kp. Then, the roll sheet Rp or the cut sheet Kp is sent out from the first sheet feed tray 10. In the case of the roll sheet Rp, as shown in FIG. 1, the roll sheet Rp is guided in an obliquely upward direction along the rear wall 12, and is directed toward the intermediate roller pair 37 (described later) along a conveyance passage p1. In the case of the cut sheets Kp, as shown in FIG. 2, one of the cut sheets Kp is fed out from the first sheet feed tray 10 along a conveyance passage p2. The conveyance passage p2 joins with the conveyance passage p1 inside the first sheet feed tray 10 and extends toward the intermediate roller pair 37 located above the joining position. It is noted that the conveyance passage p2 is an example of a first branch of the second conveyance passage according to aspects of the present disclosures.

Figure 3:
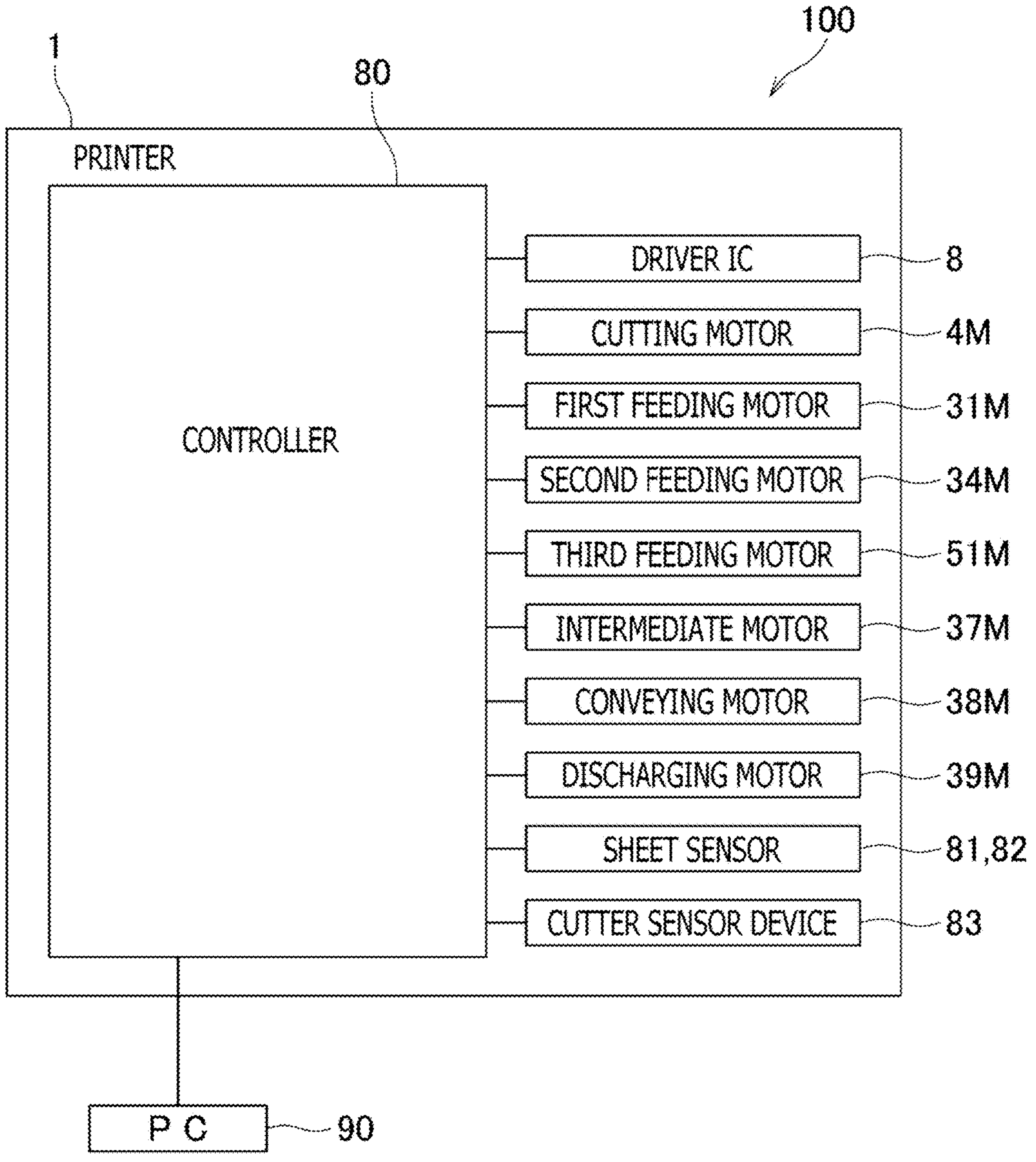
FIG. 3 is a block diagram showing an electrical configuration of the printer.

The second feeder 34 includes a feed roller 35, an arm 36 and a second feeding motor 34M (see FIG. 3). The feed roller 35 is configured to feed the cut sheet Kp from the second sheet feed tray 20. The feed roller 35 is arranged above a bottom wall 21. The feed roller 35 is axially supported at a top of the arm 36, and is driven to rotate by the second feeding motor 34M. The arm 36 is rotatably supported by the supporting shaft 36*a*. The supporting shaft 36*a* is supported by the housing 1*a*. A force is applied to the arm 36 from an elastic member, such as a plate spring or a coil spring, to urge the feed roller 35 toward the bottom wall 21. The arm 36 is rotated by a conventionally-known rotating mechanism in such a manner that the feed roller 35 is located at a position higher than the top of the rear side wall 22 of the second sheet feed tray 20 when the second sheet feed tray 20 is inserted into or removed from the housing 1*a*.

When the cut sheets KP are placed on the bottom wall 21, the feed roller 35 contacts the uppermost one of the stacked cut sheets Kp. In a state where the feed roller 35 contacts the uppermost cut sheet Kp, when the second feeding motor 34M is driven under control of the controller 80, the feed roller 35 rotates, and a conveying force directed from the front side to the rear side is applied to the cut sheet Kp contacting the feed roller 35, thereby the cut sheet Kp being fed out from the second sheet feed tray 20. The cut sheet Kp is then guided obliquely upward direction by the rear wall 22 and conveyed toward the guide 60 located above along a conveyance passage p3. It is noted that the conveyance passage p3 is an example of a second branch of the second conveyance passage according to aspects of the present disclosures.

The feed roller 51 is configured to feed the short sheet from the MP tray 40. The feed roller 51 is supported by the housing 1*a* at a position near the lower end of the tray body 41 in the state of use as shown in FIGS. 1 and 2, and is driven to rotate by a third feeding motor 51M (see FIG. 3). As described above, when the third feeding motor 51M is driven under control of the controller 80 in a state where the short sheets are set on the tray body 41, the feed roller 51 rotates and a conveying force directed toward an obliquely lower front direction is applied to the short sheet, thereby the short sheet being fed from the MP tray 40 toward the guide 60 along a conveyance passage p4.

The intermediate roller pair 37 has a drive roller and a driven roller that are rotated by a driving force of an intermediate motor 37M (see FIG. 3). When the intermediate motor 37M is driven by the controller 80, the intermediate roller pair 37 rotates while sandwiching the sheet P between the drive roller and the driven roller to convey the sheet P. The intermediate roller pair 37 is arranged above the rear wall 12 of the first sheet feed tray 10. On the partition plate 1*b*, a through opening 1*c* is formed at a position facing the intermediate roller pair 37. The intermediate roller pair 37 sandwiches the sheet P, between the drive roller and the driven roller, fed out of the first sheet feed tray 10 and conveys the same to a position above the partition plate 1*b* via the through opening 1*c*.

The guide 60 is a wall member configured to guide the sheet P frontward, and is fixed to the housing 1*a* at a position on a rear side with respect to the conveying roller pair 38. Each of the sheet P conveyed along the conveyance passage p1 from the intermediate roller pair 37, the cut sheet of paper Kp conveyed along the conveyance passage p3 from the feed roller 35, and the short sheet conveyed along the conveyance passage p4 from the feed roller 51 arrive at the guide 60. The conveyance passages p1, p3 and p4 join at a joining point a in the vicinity of the guide 60, and are connected to a conveyance passage pk extending frontward from the guide 60 (see FIG. 1). The sheet P that reaches the guide 60 along the conveyance passage p1, p3 or p4 is guided by the guide 60 changes the direction of conveyance and is conveyed frontward to the conveying roller pair 38 along the conveyance passage pk.

A passage defined from the conveyance passage p1 to the conveyance passage pk is an example of a first conveyance passage according to aspects of the present disclosures. Further, a passage defined from the conveyance passage p2 to the conveyance passage pk through the conveyance passage p1, a passage defined from the conveyance passage p3 to the conveyance passage pk, a passage defined from the conveyance passage p4 to the conveyance passage pk is an example of a second conveyance passage according to aspects of the present disclosures.

The conveying roller pair 38 includes a drive roller that is driven by a conveying motor 38M to rotate (see FIG. 3) and a driven roller that accompanies the drive roller. The discharging roller pair 39 includes a drive roller that is driven by a discharging motor 39M to rotate (see FIG. 3) and a driven roller that accompanies the drive roller. When the conveying motor 38M and the discharging motor 39M are driven by the controller 80, the conveying roller pair 38 and the discharging roller pair 39 rotate and sandwich the sheet P to convey the same.

The conveying roller pair 38 is arranged on the rear side with respect to the head 5, while the discharging roller pair 39 is arranged on the front side with respect to the head 5. The conveying roller pair 38 conveys the sheet P frontward while sandwiching the sheet P conveyed along the conveyance passage pk from the guide 60. The discharging roller pair 39 conveys the sheet P, which is conveyed frontward by the conveying roller pair 38, further frontward while sandwiching the sheet P between the drive roller and the driven roller.

The cutting device 4 includes a cutter 4*a* removably installed in the housing 1*a*, a cutting motor 4M (see FIG. 3), and a moving mechanism (not shown) to move the cutter 4*a*. The cutter 4*a* is located in the midst of the conveyance passage p1, between the intermediate roller pair 37 and the guide 60. Specifically, the cutter 4*a* is located above the rear end of the first sheet feed tray 10 and below the intermediate roller pair 37. The cutter 4*a* includes, for example, a disk-shaped rotating blade and a driven blade. Alternatively, the cutter 4*a* may include a rotating blade and a stationary blade. The cutter 4*a* rotates its blade when driven by the cutting motor 4M. The moving mechanism has the cutter 4*a*, an endless belt to which the cutter 4*a* is fixed, and a pair of pulleys around which the endless belt is wound. The cutting motor 4M is also connected to one of the pulleys. As the cutting motor 4M rotates the one of the pulleys, thereby moving the endless belt reciprocally in the right-left direction. Thus, the cutter 4*a* fixed to the endless belt is reciprocally moved in the right-left direction.

The roll sheet Rp unwound from the roll body R and conveyed is cut along the width direction by the cutter 4*a* when the cutting motor 4M is driven under the control of the controller 80. In this way, a trailing edge is formed on the roll sheet Rp that is to be fed to the sheet discharge tray 6. Hereafter, the operation of the cutting device 4 to cut the roll sheet Rp is referred to as a "cutting operation."

The head 5 is of a well-known type and includes a plurality of nozzles formed on the lower surface thereof, and a driver IC 8 (see FIG. 3). The head 5 is configured to form (print) an image on the sheet P which is conveyed by the conveyer 30. When the driver IC 8 is driven by the controller 80, ink is ejected from the nozzles and an image is formed on the sheet P when the sheet P, which is conveyed by the conveyer 30, passes through a position facing the head 5. The head 5 can be of either a linear type, which ejects ink from the nozzles at a fixed position, or a serial type, which ejects ink from the nozzles while being reciprocally moved in the right-left direction. It is noted that the head 5 is an example of an image forming device according to aspects of the present disclosures.

The discharge tray 6 constitutes an upper front wall of the housing 1*a*, and the discharge tray 6 is openable and closable with respect to the housing 1*a*. The sheet P on which the image has been formed by the head 5 is conveyed frontward by the conveyer 30 and received by the discharge tray 6 in an open state. In this way, the sheet P is discharged from the inside of the housing 1*a*.

A sheet sensor 81 is provided slightly below the intermediate roller pair 37. The sheet sensor 81 is configured to output a detection result indicating whether the sheet P is present or absent at a position where the intermediate roller pair 37 is located to the controller 80. The detection result of the sheet sensor 81 is used, for example, to determine whether a sheet jam has occurred. When the detection result of the sheet sensor 81 indicates that the sheet P remains at the position of the intermediate roller pair 37 even though the sheet P with the image formed by the head 5 has been discharged from the discharge tray 6, the controller 80 determines that a jam has occurred at the intermediate roller pair 37 or in its surrounding area. When it is determined that a jam has occurred at this position or its surrounding area, the sheet P cannot be conveyed from upstream of the intermediate roller pair 37 in the conveyance direction, i.e., from the first sheet feed tray 10.

A sheet sensor 82 is provided slightly behind (i.e., on the rear side with respect to) the conveying roller pair 38. The sheet sensor 82 outputs a detection result indicating whether or not the sheet P is present at the position of the conveying roller pair 38 to the controller 80. The detection result of the sheet sensor 82 is used, for example, to determine the occurrence status of a jam. When the detection result of the sheet sensor 82 indicates that the sheet P remains at the position of the conveying roller pair 38 even though the sheet P, on which an image has been formed by the head 5, has been discharged from the discharge tray 6, the controller 80 determines that a jam has occurred at or around the conveying roller pair 38. The conveying roller pair 38 is arranged on the downstream side, in the conveying direction, with respect to the joining point α of the conveyance passages p1, p3 and p4. Accordingly, when the jam occurs at this position or its surrounding area, the sheet P cannot be conveyed to the head 5 whichever one of the conveyance passages p1, p3 and p4 is used.

A cutter sensor device 83 is provided in the vicinity of the cutting device 4 to detect statuses of the cutting device 4. A detection result of the cutter sensor device 83 is output to the controller 80. The statuses of the cutting device 4 detected by the cutter sensor device 83 include whether the cutting device 4 is operating or not, a lifetime, whether a cutter 4*a* is attached or not, and whether the jam is being occurred or not. It is noted that the sheet sensors 81 and 82 and the cutter sensor device 83 are examples of a detector according to aspects of the present disclosures.

The cutter sensor device 83 includes a switch and a rotary encoder for detecting various statuses. The switch is provided to a portion where the cutter 4*a* is attached, and the ON/OFF state of the switch is changed depending on whether the cutter 4*a* is attached to the cutting device 4 or not. Based on the state of the switch, the controller 80 determines whether the cutter 4*a* is attached to the cutting device 4.

The rotary encoder outputs a detection result indicating the number of rotations of the pulley of the movement mechanism of the cutter 4*a*. The controller 80 accumulates the number of rotations of the pulley since the beginning of the first use in the device based on the detection results of the rotary encoder. Then, based on whether the accumulated number of rotations of the pulley has exceeded a particular threshold, the controller 80 determines whether the end of the service life of the cutting device 4 has been reached. Further, when the pulley does not rotate although the cutting motor 4M is driven, the controller 80 determines that, based on the detection result of the rotary encoder, the cutter 4*a* cannot move due to some malfunction occurred in the cutting device.

In the cutting device 4, if the cutter 4*a* is not installed, if the service life of the cutter 4*a* has been reached, or if the cutter 4*a* does not move due to a malfunction, the cutting device 4 becomes unusable. That is, cutting of roll sheet Rp cannot be executed in such a case, and therefore, the roll sheet Rp cannot be used. On the other hand, when cutting of the roll sheet Rp is not performable, but there is no problem in using the conveyance passages p1, p2 and pk, the cut sheets Kp in the first feed tray 10 can be used. When there is no problem in using the conveyance passages p3, p4 and pk, the cut sheets Kp in the second sheet feed tray 20 and the short sheets in the MP tray 40 can also be used. It is noted that the cases where the cutter 4*a* has not been installed, where the end of the service life of the cutter 4*a* has been reached, and where the cutter 4*a* does not move due to a malfunction are examples of "detachment," "aging," and "malfunction" according to aspects of the present disclosures, respectively. Additionally, the cases where the cutter 4*a* has not been installed in the cutting device 4 and where the attached cutter 4*a* has been detached from the cutting device 4 are also examples of "absence."

Furthermore, based on the detection results of the rotary encoder, the controller 80 determines that a cutter jam has occurred because the number of rotations of the pulley per unit time is not greater than a particular value even though the cutting motor 4M is driven (i.e., the movement speed of the cutter 4A is not increased appropriately even though the cutter 4A is controlled to move). A cutter jam is a phenomenon in which the roll sheet Rp remains in or around the cutting device 4 even after the cutting operation by the cutting device 4 has been performed, and further execution of the cutting operation is prevented by the remaining roll sheet Rp.

When the cutter jam is being occurred, since the roll sheet Rp remains at or in the vicinity of the cutting device 4, it is impossible to cause the sheet P to pass through the cutting position at which the cutting device 4 is configured to cut the roll sheet Rp. In such a case, the cutting device 4 cannot convey the sheet P via the conveying passage p1 formed in a passage between the cutting device 4 and the head 5. Therefore, when the cutter jam occurs, neither the roll sheet Rp nor the cut sheets Kp configured to be conveyed from the upstream with respect to the cutting device 4 through the conveyance passage p1 from the first feeding tray 10 can be used. On the other hand, the conveying passages p3 and p4 join the conveyance passage p1 at the joining point a, which is located downstream from the cutting device 4. Therefore, even if the cutter jam occurs, when the use of conveyance passages p3 and p4 is not obstructed by the cutter jam, the cut sheets Kp conveyed from the second sheet feed tray 20 via the conveyance passage p3 and the sheets P conveyed from the MP tray 40 via the conveyance passage p4 can be used.

The cutter sensor device 83 may have a sensor that detects the drive current of the cutting motor 4M for cutter jam detection. Based on the detection results of this sensor, the controller 80 determines whether the cutter 4*a* is prevented from operating due to the cutter jam, depending on the magnitude of the drive current of the cutting motor 4M. The cutter sensor device 83 may detect the cutter jam using an optical sensor that detects whether or not the sheet P is present at or around the position of the cutting device 4.

The controller 80 has a CPU, a ROM, and a RAM. The ROM stores programs and data when the CPU performs various controls. The RAM temporarily stores data which is used when the CPU executes the programs. The controller 80 is connected, via an internal bus (not shown), to the driver IC 8, the cutting motor 4M, the first feeding motor 31M, the second feeding motor 34M, the third feeding motor 51M, the intermediate motor 37M, the conveying motor 38M, the discharging motor 39M, the sheet sensors 81 and 82, the cutter sensor device 83, and the like.

The controller 80 performs various determining processes as described above based on the detection results by the sheet sensors 81 and 82, and the cutter sensor device 83. Further, the controller 80 controls operations of the conveyer 30 and the head 5 by controlling operations of the first feeding motor 31M and the like. Furthermore, the controller 80 performs processes based on inquiries and commands transmitted from the PC 90. For example, the controller 80 returns the status of the printer 1 in response to the inquiry from the PC 90, which will be described later. Still further, the controller 80 causes the conveyer 30 to convey the sheet P in accordance with the command, while causing the head 5 to execute image formation onto the sheet P.

In the meantime, image forming devices such as the printer 1 have been conventionally configured such that execution of the image formation (image recordation) is not permitted when an abnormality occurs, that is, when an abnormal operation of a cutting device or a cutter jam occurs. In contrast, according to the printer system 100, a process illustrated in FIG. 4 is performed in such a manner that the image formation (image recordation) can be continued even if the abnormality related to the cutting device is detected.

Figure 4:
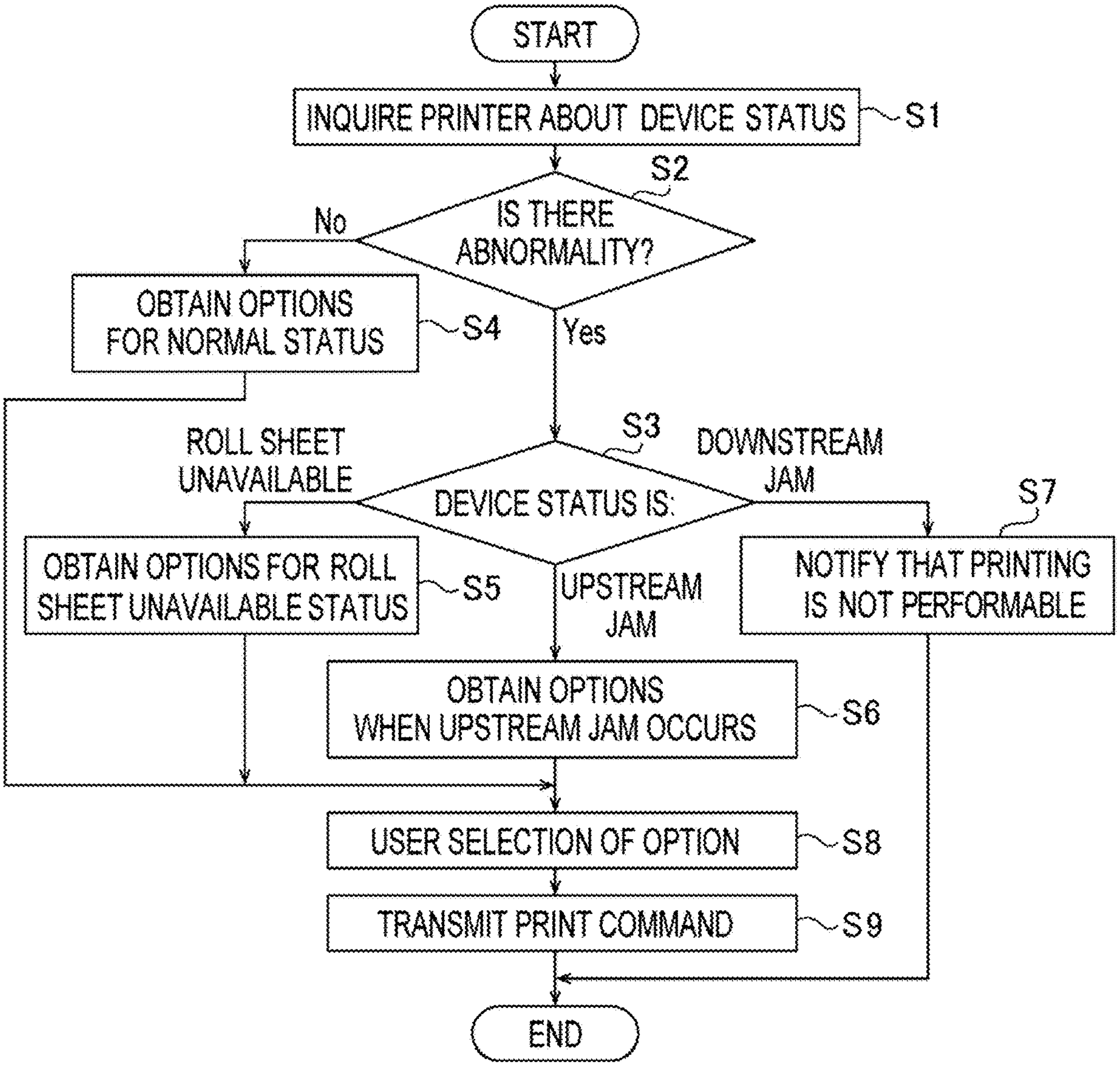
FIG. 4 is a flowchart illustrating an operation performed by the printer system.

When the process shown in FIG. 4 starts, the PC 90 firstly inquires the printer 1 about a device status according to an instruction received through the input device by the user (S1). In response to receipt of the inquiry, the printer 1 replies to the PC 90 with the device status. The device status includes a status of "no abnormality" and three abnormal statuses which are a "roll sheet unavailable," an "upstream jam occurrence," and a "downstream jam occurrence." It is noted that the status of "no abnormality" corresponds to a status in which none of the "roll sheet unavailable" status, the "upstream jam occurrence," and the "downstream jam occurrence" is occurring. It is noted that the device status is determined by the controller 80 based on detection results of the sheet sensor 81, the sheet sensor 82 and the cutter sensor device 83.

When the status of the printer 1 is the "roll sheet unavailable" status, the cutting device 4 is not usable but the conveyance of the sheet P using any of the conveyance passages p1-p4 is performable without no obstacles. This controller 80 determines that the status of the printer 1 is the "roll sheet unavailable" status when all the three conditions described below are satisfied.

The first condition is that the detection result of the cutter sensor device 83 indicates the abnormality of the cutting device 4 itself. The abnormality of the cutting device 4 corresponds to at least one of three cases: (1) the cutter 4*a* does not move although the cutting motor 4M is driven; (2) the lifetime of the cutting device 4 is expired; and (3) the cutter 4*a* is not attached to the housing 1A.

The second condition is that the detection result of the cutter sensor device 83 indicates the occurrence of the cutter jam. The third condition is that the detection result of none of the sheet sensor 81 and the sheet sensor 82 indicates the occurrence of the jam (i.e., the sheet P is unavailable). That is, no jam occurs at either the intermediate roller pair 37 or the conveying roller pair 38.

In the "upstream jam" status, the conveyance passage p1 is unusable due to a cutter jam, but the use of conveyance passages p3 and p4 is unaffected. This status is determined when both of the following two conditions are met. The first condition is that the detection result of the cutter sensor device 83 indicates the occurrence of the jam. The second condition is that the detection result of the sheet sensor 82 indicates that no jam has occurred at the position of the conveying roller pair 38.

In the "downstream jam" status, due to the occurrence of the jam at the position of the conveying roller pair 38, the sheet P cannot be conveyed to the head 5 using any of the conveyance passages p1-p4. This condition is determined when the detection result of the sheet sensor 82 indicates that the jam is occurring at the position of the conveying roller pair 38.

Next, the PC 90 determines whether there is an abnormality in the printer 1 based on the device status returned from the printer 1 (S2). The PC 90 determines that there is no abnormality when the device status is "no abnormality" (S2: No) and obtains normal-usage options as a user-selectable printing sheet options (S4). The normal options include the first sheet feed tray 10, the second sheet feed tray 20, and the roll sheet Rp, the cut sheet Kp and all other sheets contained in the MP tray 40. After execution of S4, S8 is executed.

The condition for the determination of "no abnormality" includes that neither inability to cut the roll sheet Rp due to an abnormality in the cutting device 4 itself nor an occurrence of the cutter jam is detected. Among these two conditions, the former corresponds to detection of a "first situation" according to aspects of the present disclosures, and the latter corresponds to detection of a "second situation" according to aspects of the present disclosures. Furthermore, the fact that these two conditions are necessary for obtaining a selection for normal usage corresponds to "the detector detecting neither the first status nor the second status as a necessary condition to make both the long sheet-type medium and the short sheet-type medium selectable."

The PC 90 determines that there is an abnormality if the device status is other than the "no abnormality" (S2: Yes), and further determines whether the abnormality indicated by the device status corresponds to any of the above three statuses (S3). When it is determined that the device status is "roll sheet unavailable" (S3: roll sheet unavailable), the PC 90 obtains options for the roll sheet unavailable status as the user-selectable printing sheet options (S5). The roll paper Rp accommodated in the first feed tray 10 is excluded from the options when the roll sheet is unavailable. In other words, the cut sheets stored in the first sheet feed tray 10 and second sheet feed tray 20, and the cut sheets Kp and other sheets accommodated in the MP tray 40 are available as options. After execution of S5, S8 is executed.

A determining condition of the "roll sheet unavailable" includes a case where the cutting device 4 is unable to cut the roll sheet Rp due to the abnormality of the cutting device 4 itself. The fact that this condition is necessary in order to obtain options in the case of the "roll sheet unavailable" corresponds to "the detector detecting one of the first status and the second status as a necessary condition to make the long sheet-type medium unselectable and make the short sheet-type medium selectable" according to aspects of the present disclosures. Further, the determining condition of the "roll sheet unavailable" includes a case where the cutter jam is not detected. The fact that the condition is required when obtaining the options in the case of the "roll sheet unavailable" corresponds to "the detector not detecting the second status as a necessary condition to make the short sheet-type medium conveyed thought the first branch selectable" corresponds to aspects of the present disclosures.

When it is determined that the device status is the "upstream jam" (S3: upstream jam), the PC 90 obtains options for the "upstream jam" as options regarding the user selectable printing sheets (S6). It is noted that both the roll sheet Rp and the cut sheet Kp accommodated in the first sheet feed tray 10 are excluded as the options for the upstream jam. In other words, when the abnormality is determined to be the "upstream jam," the second sheet feed tray and the cut sheets Kp and other sheets accommodated in the MP tray 40 are the options. After execution of S6, S8 is executed.

The determining condition of the "upstream jam" includes detection of occurrence of the cutter jam. The fact that this condition is necessary corresponds to "the detector detecting one of the first status and the second status as a necessary condition to make the long sheet-type medium unselectable and make the short sheet-type medium selectable" and "the detector detecting the second status as a necessary condition to make the short sheet-type medium conveyed thought the first branch unselectable and make the short sheet-type medium conveyed thought the second branch selectable."

When it is determined that the device status is the "downstream jam" (S3: downstream jam), the PC 90 cannot use any type of sheets P and notify the user that the printing is not performable (S7). The notification for the user is made, for example, by displaying comments indicating the above on the display. Then, the series of the processes is terminated.

It is noted that the determining condition for the "downstream jam" includes detection of the jam at the position of the conveying roller pair 38. This condition corresponds to a "third status" according to aspects of the present disclosures. Further, the fact that none of the sheets P is selectable when this condition is met corresponds to "the detector detecting the third status as a sufficient condition to make both the long sheet-type medium and the short sheet-type medium unselectable" according to aspects of the present disclosures.

In S8, the PC 90 displays the options obtained in any of S4-S6 on the display, and prompts the user to select one of options via the input device. Next, the PC 90 transmits a print command instructing performing printing in accordance with content selected in S8 to the printer 1 (S9). In response to the print command, the printer 1 controls the conveyer 30 and the head 5 in such a manner that the image formation is performed using the sheet P indicated by the print command transmitted from the PC 90. When the image formation is completed, the printer 1 notifies completion of the image formation to the PC 90. Then, the process is terminated.

Figure 5:
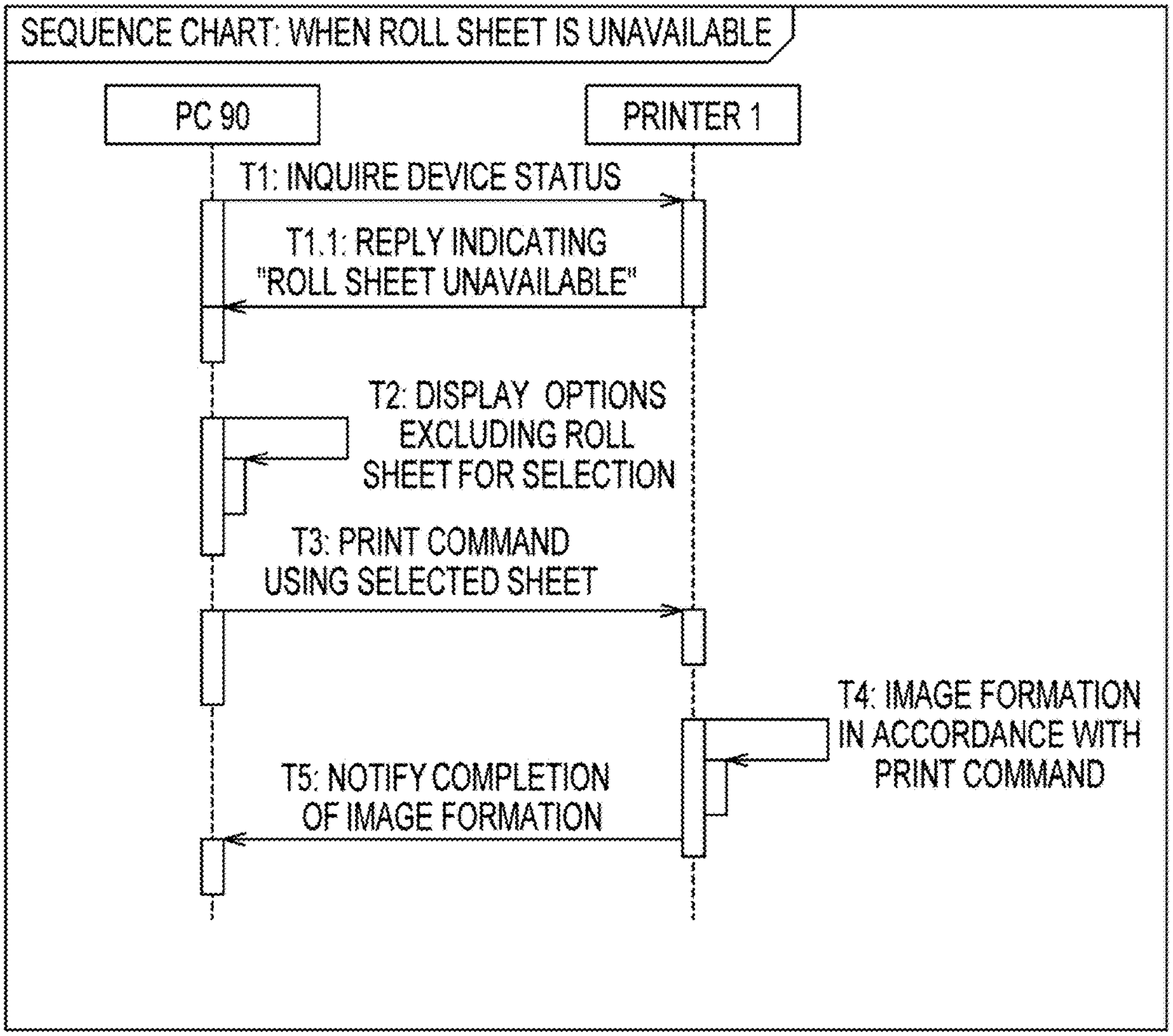
FIG. 5 is a sequence diagram showing an example of a process according to the flowchart shown in FIG. 4.
Figure 6:
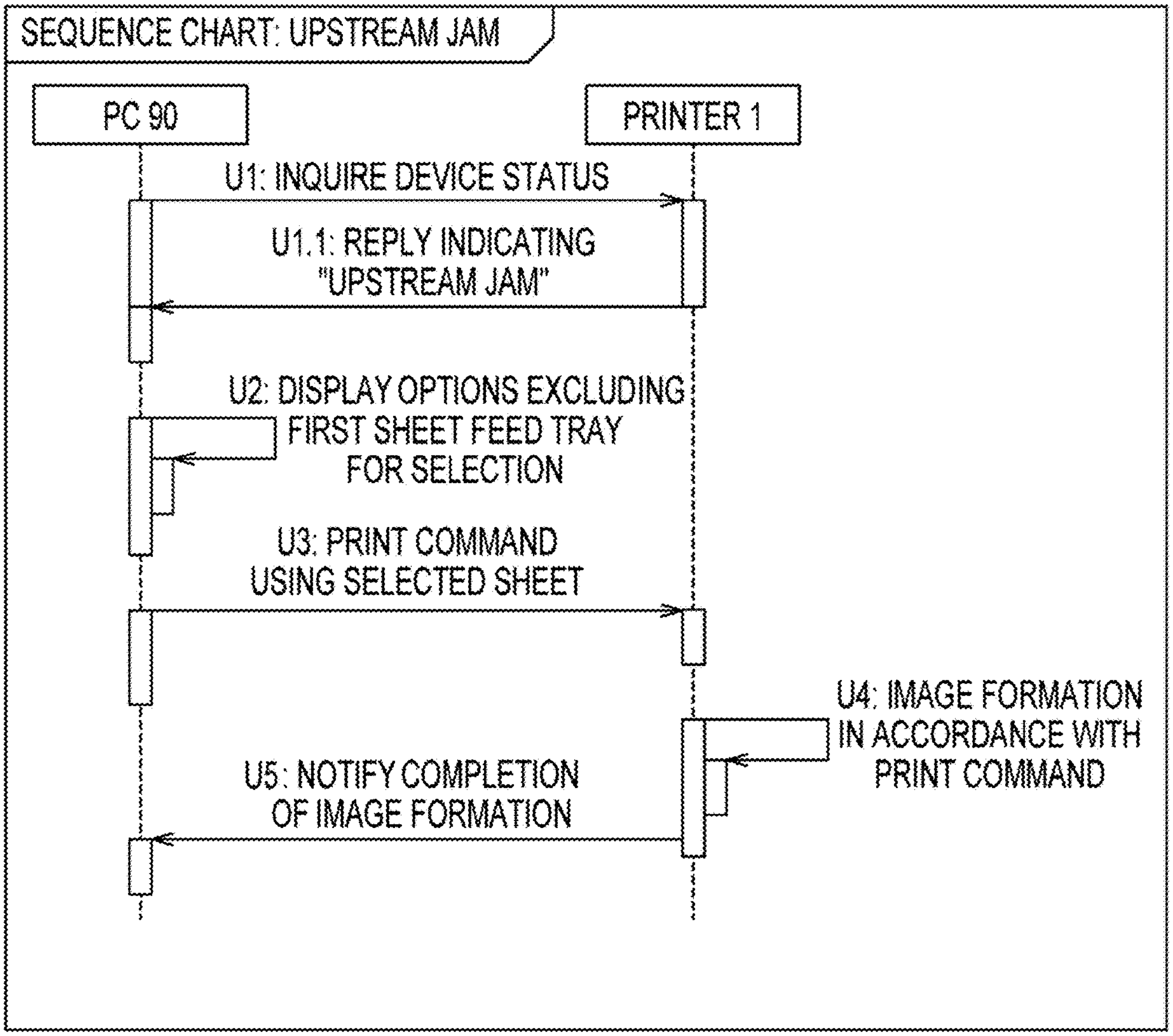
FIG. 6 is a sequence diagram showing another example of a process according to the flowchart shown in FIG. 4.

Control examples in accordance with a flowchart shown in FIG. 4 will be described with reference to FIGS. 5 and 6. Firstly, a case where a device status is the "roll sheet unavailable" will be explained referring to FIG. 5. At T1, the PC 90 inquires the printer 1 about the device status. In response to this inquiry, the printer 1 transmits the "roll sheet unavailable" to the PC 90 as the device status (T1.1). Then, the PC 90 displays the options excluding the roll sheet Rp on the display in such a manner that the user can select one of the displayed options (T2). Next, the PC 90 transmits a print command instructing execution of printing using the selected sheet P to the printer 1 (T3). In response to the print command, the printer 1 causes the conveyer 30 to convey the sheet P as selected, and causes the head 5 to perform image formation onto the sheet P in accordance with the print command (T4). When the image formation is completed, the printer 1 notifies the PC 90 of completion of the image formation (T5).

Next, a case where the device status is the "upstream jam" will be described referring to FIG. 6. At U1, the PC 90 inquires the printer 1 about the device status. In response to this inquiry, the printer 1 transmits the "upstream jam" to the PC 90 as the device status (U1.1). Then, the PC 90 displays the options excluding the roll sheet Rp and the cut sheet Kp accommodated in the first sheet feed tray 10 on the display so that the user can select one of the displayed options (U2). Next, the PC 90 transmits a print command instructing execution of printing using the selected sheet P to the printer 1 (U3). In response to the print command, the printer 1 causes the conveyer 30 to convey the sheet P as selected, and causes the head 5 to perform image formation onto the sheet P (U4). When the image formation is completed, the printer 1 notifies the PC 90 of completion of the image formation (U5).

According to the above-described embodiment, at least one of situations where the cutting device 4 cannot be used or where the roll sheet Rp cannot pass through the cutting position at which the cutting device 4 cuts the roll sheet Rp, at least the roll sheet Rp cannot be used. On the other hand, in either situation, it is still possible to convey the cut sheet Kp or other short length sheets using the conveyance passages p2-p4. Accordingly, even if one of the above-mentioned situations has occurred in the printer 1, it is possible for the user to select the image formation on the cut sheet Kp or other short length sheet. That is, even if the abnormality of the cutting device 4 is detected, depending on the content of the abnormality, it may be possible to perform the image forming process, thereby improving convenience.

When a situation where the sheet P is unable to pass through the cutting position of the cutting device 4 for the roll sheet Rp is not detected, the cut sheet Kp accommodated in the first sheet feed tray 10 is included in the options. Therefore, options for the sheets P are secured, thereby improving convenience.

Even if a situation where the sheet P cannot pass through the cutting position of the cutting device 4 for the roll sheet Rp is detected, the cut sheet Kp or other sheets using the conveyance passage p3 or p4 may be selectable. Therefore, even if the cut sheet Kp accommodated in the first sheet feed tray 10 cannot be selected, options for the sheets P are secured, thereby improving convenience.

When the jam at the position of the conveying roller pair 38, which position is closer to the head 5 than the cutter jam, is detected, a notification indicating that none of the sheets P can be used is notified to the user. Therefore, a situation that none of the sheets P including the roll sheet Rp, the cut sheet Kp and other short length sheets cannot be used is clarified to the user.

The embodiment according to aspects of the present disclosures has been described with reference to the accompanying drawings. It is noted that the concrete configuration is not necessarily limited to the above-described embodiment. Rather, various modifications may be considered to be included in aspects of the present disclosures. Inventions set forth in respective claims define scopes which should be considered to include all modifications within meaning and scope of the claims and equivalents.

For example, in the printer system 100 described above, options for the sheet P is selected by the user in the PC 90 based on the detected device status of the printer 1. However, the configuration may be modified in such a manner that the options for the sheets P are displayed on a display device provided to the printer 1 and the user is allowed to select one of the options using an input device also provided to the printer 1. That is, the sheet P can be selected on the printer 1 side without using the PC 90 for selecting the sheet P.

In the above-described embodiment, as the sheets P other than the roll sheet Rp, the cut sheets Kp are accommodated in the first sheet feed tray 10, the cut sheets Kp are accommodated in the second sheet feed tray 20, and the cut sheets Kp or other short length sheets are accommodated in the MP tray 40. Further, the conveyance passage p1-p4 corresponding to the above sheets other than the roll sheet Rp are provided.

However, the printer 1 may not include a configuration to accommodate all of the cut sheets Kp and the other types of short sheets, the printer 1 may have a configuration to accommodate at least one of the cut sheet Kp or the other types of short sheets. In that case, the printer 1 may include necessary configuration to convey the accommodated sheets from among the conveyance passages p2-p4.

Further, in the above-described embodiment, as a sensor to detect an occurrence of the cutter jam, the cutter sensor device 83 is provided. It is noted that the sheet sensor 81 may be used as a sensor to detect occurrence of the cutter jam. The sheet sensor 81 is for detecting whether the jam is occurring at the position of the intermediate roller pair 37. Since the intermediate roller is for detecting the jam at the position of the intermediate roller pair 37. Since the sheet sensor 81 is closer to the cutting device 4, when the intermediate roller pair 37 detects the occurrence of the jam, it is assumed that the cutter jam, which is the jam at the cutting device 4, is occurring. Therefore, when the detection result of the sheet sensor 81 indicates the occurrence of the jam, it may be determined that the cutter jam is occurring.

In the above-described embodiment, a case where aspects of the present disclosures are applied to the printer 1 is explained. The configuration does not need to be limited such a configuration, but aspects of the present disclosures may be applied to an MFP or copier as far as the image forming device including an inkjet printer, a laser printer or a thermal printer is incorporated.

What is claimed is:

1. An image forming device configured to form an image on sheet-type medium including a rolled-type medium and a plurality of short sheet-type media, comprising:
- a first medium container configured to accommodate the rolled-type medium by winding a long sheet-type medium in a roll;
- a second medium container configured to accommodate the plurality of short sheet-type media in a stacked manner;
- a medium conveyer configured to convey the sheet-type medium;
- an image forming unit configured to form an image on the sheet-type medium conveyed by the medium conveyer;
- a cutting device configured to cut the rolled-type medium; and
- a controller configured to
  - determine content of an error in a case where the error occurs in an operation related to print on the rolled-type medium accommodated in the first medium container; and
  - provide an option other than the rolled-type medium as the sheet-type medium to be used based on the content of the error, the option including the plurality of short sheet-type media accomodated in the second medium container,
- wherein, when receiving a print instruction to print an image by the image forming unit while receiving selection of the plurality of short sheet-type media accommodated in the second medium container as the option, the controller is configured to cause the medium conveyer to convey the plurality of short sheet-type media accommodated in the second medium container.

2. The image forming device according to claim 1,
- wherein the error includes a sheet jam which is a malfunction of conveyance of the rolled-type medium at the medium conveyer.

3. The image forming device according to claim 1,
- wherein the error includes a cutter jam which is a malfunction of cutting of the rolled-type medium at the cutting device.

4. The image forming device according to claim 1, further comprising:
- a detector configured to detect a first status and a second status, the first status being a status that the cutting device is not usable, the second status being a status that the rolled-type medium is unable to pass through a cutting position of the cutting device, wherein the controller receives a detection result from the detector to determine the content of the error; and
- a transmitting device configured to transmit a notification in accordance with the detection result of the detector, and
- wherein the cutting device is configured to cut the rolled-type medium at the cutting position along a first conveyance passage that is a conveyance passage for the rolled-type medium extending from the first medium container to the image forming unit;
- wherein a second conveyance passage that is a conveyance passage of the medium conveyer extending from the second medium container to the image forming unit satisfies at least one of:
  - the plurality of short sheet-type media being conveyable in the first status; and
  - the plurality of short sheet-type media being conveyable in the second status,
- wherein the controller is configured to:
  - select, based on a user input, one of the rolled-type medium and the plurality of short sheet-type media satisfying a particular condition in accordance with the detection result of the detector; and
  - generate and transmit a command indicating use of the selected one of the rolled-type medium and the plurality of short sheet-type media to the image forming unit, and
  - wherein the particular condition includes:
    - the detector detecting neither the first status nor the second status as a necessary condition to make both the rolled-type medium and the plurality of short sheet-type media selectable; and
    - the detector detecting one of the first status and the second status as a necessary condition to make the rolled-type medium unselectable and make the plurality of short sheet-type media selectable as the option.

5. The image forming device according to claim 4,
- wherein the second conveyance passage includes a first branch of the second conveyance passage joining the first conveyance passage at a position farther from the image forming unit with respect to the cutting position, and
- wherein the particular condition includes the detector not detecting the second status as a necessary condition to make the plurality of short sheet-type media conveyed through the first branch selectable.

6. The image forming device according to claim 5, wherein the second conveyance passage includes a second branch of the second conveyance passage joining the first conveyance passage at a position closer to the image forming unit with respect to the cutting position, and wherein the particular condition includes the detector detecting the second status as a necessary condition to make the plurality of short sheet-type media conveyed through the first branch unselectable and make the plurality of short sheet-type media conveyed through the second branch selectable.

7. The image forming device according to claim 4, wherein the detector is further configured to detect a third status that both the first conveyance passage and the second conveyance passage are unusable, and wherein the particular condition includes the detector detecting the third status as a sufficient condition to make both the rolled-type medium and the plurality of short sheet-type media unselectable.

8. The image forming device according to claim 7, wherein the second status is due to remaining of the sheet-type medium at the cutting device or in vicinity of the cutting device, and wherein the third status is due to remaining of the sheet-type medium at a position, in the first conveyance passage, closer to the image forming unit with respect to a position where the sheet-type medium remains in the second status.

9. The image forming device according to claim 4, wherein the first status is due to at least one of malfunction, aging and absence of the cutting device.

10. The image forming device according to claim 4, wherein the second status is due to remaining of the sheet-type medium at the cutting device or in vicinity of the cutting device.

11. The image forming device according to claim 1, wherein the cutting device is located on a conveyance passage for the rolled-type medium extending from the first medium container to the image forming unit, the cutting device being located between the first medium container and the image forming unit.

* * * * *